No. 865,293. PATENTED SEPT. 3, 1907.
G. BRÜSTLE.
BROOM.
APPLICATION FILED MAR. 21, 1907.

Witnesses:

Inventor:
Georg Brüstle.

UNITED STATES PATENT OFFICE.

GEORG BRÜSTLE, OF STUTTGART, GERMANY.

BROOM.

No. 865,293.  Specification of Letters Patent.  Patented Sept. 3, 1907.

Application filed March 21, 1907. Serial No. 363,703.

*To all whom it may concern:*

Be it known that I, GEORG BRÜSTLE, mechanic, a citizen of the German Empire, and a resident of Stuttgart, Würtemberg, Germany, have invented a new and useful Device for Fixing Birch-Brooms and Similar Articles to a Handle, of which the following is a specification.

The object of the present invention is to construct an easily detachable device for fixing the commonly used birch broom and the like to a handle. There are for this purpose attached to a shell to take the broom handle, movable arms, which possess sharp points, which on the arms being closed, are pressed between the sprigs of the broom, which in this manner is held tightly. The arms are then held firmly together by a locking device, which consists of a suitable chain, which is fixed to one of the arms and drawn around the broom and the other arm. By passing the nearest link over the hook of the first arm, the device is locked. This fixing device can thereby be easily and quickly loosened, and is therefore preferred to others especially on account of the simple locking device, which can be used for brooms of all sizes and thickness without altering any part, while in other known devices, it is effected by means of a screw or such like, for which naturally some special appliance has to be used and always carried about.

An example working form of the present invention is shown on the annexed drawing, in which:—

Figure 1:
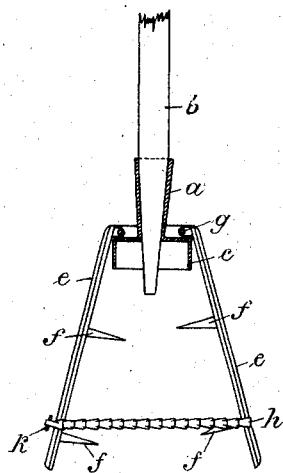
Figure 2:
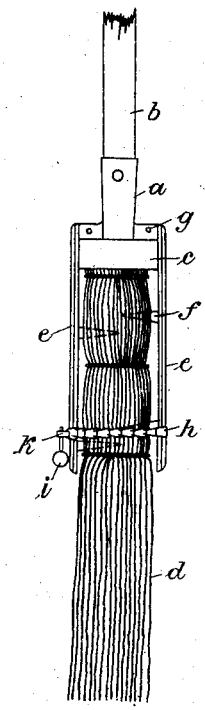
Figure 3:
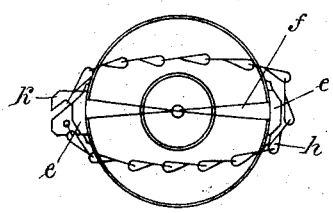
Figure 4:
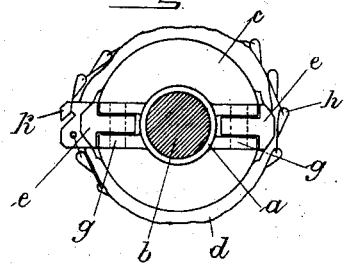

Figure 1 shows a front view of the device open. Fig. 2 shows a front view of the device in use. Fig. 3 shows a bottom plan of Fig. 1 on an enlarged scale. Fig. 4 shows a section of Fig. 2 on an enlarged scale.

The device consists of a shell $a$ into which the broom handle $b$ is fitted, said shell $a$ possessing a plate with or without a rim $c$, against which is laid the broom $d$. On the shell $a$ are further, movable arms $e$ which are held by means of the bolts or pins $g$, which possess sharp points $f$, which latter when in use are pressed between the sprigs to hold firmly the broom $d$. To keep the arms $e$ in a closed position, a chain $h$ is fixed to one of these in the present invention, which is slung around the broom $d$ and the other arm, by which means, one of the links of the chain $h$ can be hung on the hook $k$ on the arm $e$, so that an unintentional opening of the device is prevented. Suitable for the purpose of opening the device, a ring $i$ is fixed to the chain $h$, which facilitates the handling of the same.

Having fully described my invention, what I claim and desire to secure by Letters Patent is:—

In a device for attaching brooms to handles, a socket or snell for the handle, arms pivoted to said socket and provided with inwardly extending points to engage the brooms, one of said arms being provided with a hook, and a chain adapted to be passed around the broom and the other arm, and attached to the hook, substantially as described and shown and for the purpose set forth.

In testimony whereof I have hereunto set my hand in the presence of two subscribing witnesses.

GEORG BRÜSTLE.

Witnesses:
ERNST ENTENMOCH,
WM. HAHN.